US012478554B2

(12) United States Patent
Kimura et al.

(10) Patent No.: US 12,478,554 B2
(45) Date of Patent: Nov. 25, 2025

(54) PHARMACEUTICAL CONTAINER, METHOD FOR MANUFACTURING PHARMACEUTICAL CONTAINER, AND COATING AGENT

(71) Applicant: NIPPON ELECTRIC GLASS CO., LTD., Otsu (JP)

(72) Inventors: Miki Kimura, Otsu (JP); Toru Shiragami, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 349 days.

(21) Appl. No.: 17/908,993

(22) PCT Filed: Mar. 8, 2021

(86) PCT No.: PCT/JP2021/008930
§ 371 (c)(1),
(2) Date: Sep. 2, 2022

(87) PCT Pub. No.: WO2021/182379
PCT Pub. Date: Sep. 16, 2021

(65) Prior Publication Data
US 2023/0112180 A1    Apr. 13, 2023

(30) Foreign Application Priority Data

Mar. 9, 2020 (JP) ................. 2020-039501
Jun. 4, 2020 (JP) ................. 2020-097693
Oct. 16, 2020 (JP) ................. 2020-174858

(51) Int. Cl.
| | |
|---|---|
| A61J 1/14 | (2023.01) |
| C03C 3/091 | (2006.01) |
| C03C 3/097 | (2006.01) |
| C03C 3/11 | (2006.01) |
| C03C 3/118 | (2006.01) |
| C03C 17/00 | (2006.01) |
| C03C 17/30 | (2006.01) |
| C08G 77/00 | (2006.01) |
| C08G 77/04 | (2006.01) |
| C09D 5/00 | (2006.01) |
| C09D 183/04 | (2006.01) |

(52) U.S. Cl.
CPC ............ *A61J 1/1468* (2015.05); *C03C 3/091* (2013.01); *C03C 3/097* (2013.01); *C03C 3/11* (2013.01); *C03C 3/118* (2013.01); *C03C 17/004* (2013.01); *C03C 17/30* (2013.01); *C08G 77/04* (2013.01); *C09D 5/00* (2013.01); *C09D 183/04* (2013.01); *C03C 2218/32* (2013.01); *C08G 77/80* (2013.01)

(58) Field of Classification Search
CPC ....... C03C 3/091; C03C 3/118; C03C 17/004; C03C 17/30; C03C 2218/32; C03C 3/085; C03C 3/093; C03C 3/112; C03C 4/20; C03C 3/11; C03C 3/097; C08G 77/04; C08G 77/80; C09D 183/04; C09D 7/63; C09D 5/00; A61J 1/1468
See application file for complete search history.

(56) References Cited

U.S. PATENT DOCUMENTS

| | | | |
|---|---|---|---|
| 5,697,991 A | 12/1997 | Frazer | |
| 5,800,926 A | 9/1998 | Nogami et al. | |
| 11,542,191 B2 * | 1/2023 | Arai | ................. C03C 3/11 |
| 2004/0199138 A1 | 10/2004 | McBay et al. | |
| 2010/0075077 A1 | 3/2010 | Bicker et al. | |
| 2011/0117746 A1 | 5/2011 | Maruyama et al. | |
| 2015/0136723 A1 | 5/2015 | Bamba et al. | |
| 2017/0361513 A1 | 12/2017 | Surra | |
| 2019/0292097 A1 | 9/2019 | Wagner et al. | |
| 2020/0283331 A1 | 9/2020 | Arai | |
| 2023/0123424 A1 | 4/2023 | Arai | |
| 2024/0018033 A1 | 1/2024 | Arai | |

FOREIGN PATENT DOCUMENTS

| | | |
|---|---|---|
| EP | 3 260 431 A1 | 12/2017 |
| JP | H05-132065 A | 5/1993 |
| JP | H08-175998 A | 7/1996 |
| JP | H09-208898 A | 8/1997 |
| JP | 2013-203989 A | 10/2013 |
| JP | 2016-505455 A | 2/2016 |
| WO | WO-03/007868 A1 | 1/2003 |
| WO | WO-2010-010928 A1 | 1/2010 |
| WO | WO-2013-179514 A1 | 12/2013 |
| WO | WO-2014/085246 A1 | 6/2014 |
| WO | WO-2019/078188 A1 | 4/2019 |

OTHER PUBLICATIONS

Partial Supplementary European Search Report issued Mar. 19, 2024 in Application No. 21766935.7.
Second Chinese Office Action issued Sep. 27, 2024 in Application No. 202180019182.5.
Japanese Office Action issued May 2, 2024 in Application No. 2022-507169.
Extended European Search Report issued Jun. 11, 2024 in Application No. 21766935.7.
First Chinese Office Action issued Mar. 29, 2024 in Application No. 202180019182.5.
International Search Report mailed Apr. 20, 2021 for PCT/JP2021/008930.
Written Opinion of the International Searching Authority mailed Apr. 20, 2021 for PCT/JP2021/008930.

(Continued)

*Primary Examiner* — Michael C Miggins
(74) *Attorney, Agent, or Firm* — Faegre Drinker Biddle & Reath LLP

(57) ABSTRACT

A pharmaceutical container of the present invention is a pharmaceutical container including at least a container and a coating layer, and is characterized that the coating layer is coated on at least an inner surface of the container and the coating layer contains a silicone-based resin.

4 Claims, No Drawings

(56) References Cited

OTHER PUBLICATIONS

Japanese Office Action issued Jul. 10, 2024 in Application No. 2022-507169.
Japanese Office Action issued Oct. 2, 2024 in Application No. 2022-507169.
Chinese Decision of Rejection issued Jan. 14, 2025 in Application No. 202180019182.5.

* cited by examiner

PHARMACEUTICAL CONTAINER, METHOD FOR MANUFACTURING PHARMACEUTICAL CONTAINER, AND COATING AGENT

TECHNICAL FIELD

The present invention relates to a pharmaceutical container with good water repellency and good resistance to a preparation having a wide pH range, a method for manufacturing the pharmaceutical container, and a coating agent, and more specifically, relates to a pharmaceutical container in which at least an inner surface of the container is coated with a coating layer containing a silicone-based resin, a method for manufacturing the same, and a coating agent containing the silicone-based resin.

BACKGROUND ART

Pharmaceutical containers such as vial containers and ampoule containers are required to have high chemical durability in order to stably store preparations. Therefore, borosilicate glass having excellent chemical resistance is used for the pharmaceutical containers.

The pharmaceutical container is subjected to cleaning using a jet water flow, detergent cleaning, ultrasonic cleaning, and the like before being filled with a preparation. Further, dry heat sterilization treatment at about 300° C. is performed for inactivation of pyrogen. Therefore, it is important that the pharmaceutical container is not altered, deteriorated, peeled, or the like even after the cleaning process or the dry heat sterilization treatment. In particular, it is important that the pharmaceutical container is not altered, deteriorated, peeled, or the like even when the container is filled with preparations having various pH values.

Patent Literature 1 proposes a method for improving water repellency, water resistance, and alkali resistance of a glass container by forming a fluororesin-based coating layer on an inner surface of the container. However, since the coating layer contains fluorine, there is a problem in terms of environmental load and handling.

Patent Literature 2 proposes a method for improving water repellency of a glass container by forming a fluorine-containing coating layer on an inner surface of the container, and a method for reducing a Si elution amount when the container is filled with water and is autoclaved. However, since the coating layer contains fluorine, there is a problem in terms of environmental load and handling.

CITATION LIST

Patent Literature

Patent Literature 1: WO 2013/179514
Patent Literature 2: JP-A-5-132065

SUMMARY OF INVENTION

Technical Problem

Since a glass surface of borosilicate glass has very high hydrophilicity, it is a factor that causes the following problem, for example.

In a case of an injection, it is necessary to reliably administer a predetermined dose to a patient. However, when the hydrophilicity of the glass surface is high, a liquid may remain on an inner surface of a container, and the injection may not be administered in an appropriate amount. This point is a very serious problem, and in order to solve this problem, it is the present situation that a preparation is filled in excess of an appropriate amount in consideration of a residual amount in advance. As a result, the preparation is administered in excess of an appropriate amount, and preparation cost increases.

It is known that biopreparations that have been developed in recent years are extremely unstable, and therefore alter due to external factors such as temperature fluctuation and vibration. Therefore, a solution is lyophilized. However, when the hydrophilicity of the glass surface is high, the solution in the container rises inside a container body portion during a lyophilization process and is cloudy after the lyophilization, which may cause a problem that visibility and an appearance of the container are deteriorated.

In order to solve the above problem, it is effective to form a coating layer on the inner surface of the container, but the current coating layer contains a halogen component such as a fluorine component as described above, and thus there is a problem in terms of environmental load and handling.

Therefore, an object of the present invention is to propose a pharmaceutical container which has a low environmental load, is easy to handle, and has high water repellency, and a method for manufacturing the same. Another object of the present invention is to provide a coating agent for enhancing water repellency of a coating layer.

Solution to Problem

The present inventors have conducted various experiments and found that the above technical problems can be solved by coating an inner surface of a container with a coating layer containing a silicone-based resin, and have proposed the present invention. That is, the pharmaceutical container of the present invention is a pharmaceutical container including at least a container and a coating layer, and is characterized that the coating layer is formed on at least an inner surface of the container and the coating layer contains a silicone-based resin.

In the pharmaceutical container of the present invention, the silicone-based resin is preferably an organopolysiloxane compound having one or more organic substituents selected from a group consisting of a methyl group, a phenyl group, an epoxy group, an ether group, and a polyester group. The pH of a preparation is designed to be about 6 to 8 so as not to feel pain or numbness at the time of administration. However, depending on a type of the preparation, the preparation may be acidic or alkaline, such as pH 4 or pH 11. Borosilicate glass has a certain degree of resistance to an acidic solution, but is easily eroded by an alkaline solution. Therefore, when the pH of the preparation is increased, there is a risk that a glass component of the container is dissolved to cause alteration of the preparation. Therefore, when the silicone-based resin is introduced into the coating agent, good water repellency can be maintained and deterioration, peeling, and the like of the coating layer can be prevented even in a case where a preparation having a wide pH range is filled in the container and stored for a long period of time.

In the pharmaceutical container of the present invention, it is preferable that the coating layer is substantially free of a halogen component. Here, "substantially free of a halogen component" means that a content of the halogen component in the coating layer is less than 0.8% by mass.

In the pharmaceutical container of the present invention, the coating layer preferably has a thickness of 10 to 2500 nm. Accordingly, defects such as pinholes are less likely to occur, and stress generated after thermal curing is reduced. Thus, deterioration, peeling, and the like of the coating layer can be prevented.

In the pharmaceutical container of the present invention, the container is made of silicate glass, and the silicate glass preferably contains, by mass, 65 to 85% of $SiO_2$, 0 to 15% of $Al_2O_3$, 0 to 13% of $B_2O_3$, 0 to 5% of $Li_2O$, 3 to 15% of $Na_2O$, 0 to 5% of $K_2O$, 0 to 5% of MgO, 0 to 15% of CaO, and 0 to 5% of BaO as a glass composition. Accordingly, it is possible to increase chemical resistance of the container while maintaining workability into a container shape.

In the pharmaceutical container of the present invention, a Si elution amount when a heat treatment is performed at 121° C. for 180 minutes in a state where the pharmaceutical container is filled with purified water is preferably 40 μg/mL or less, 35 μg/mL or less, more preferably 25 μg/mL or less, and particularly preferably 15 μg/mL or less. When the Si elution amount is large, there is a risk of reprecipitation in a solvent and becoming insoluble foreign matter.

In the pharmaceutical container of the present invention, a relationship of X/Y≤10, further X/Y≤7, particularly X/Y≤5 is preferably satisfied, where X μg/mL is a Si elution amount when a heat treatment is performed at 121° C. for 180 minutes in a state where the container is filled with 3% by mass of citric acid aqueous solution at pH 8 and Y nm is a thickness of the coating layer.

In the pharmaceutical container of the present invention, when the purified water is dropped onto a bottom surface of the container in an amount (ml) equivalent to a bottom area of the container S $cm^2$×0.1, and then the container is tilted to the left and right, then erected, and further horizontally placed, a bottom area S' covered with the purified water is preferably 90% or less, more preferably 85% or less, particularly preferably 80% or less of the bottom area S $cm^2$.

The container of the present invention includes at least a coating layer. In the container of the present invention, when the purified water is dropped onto the bottom surface of the container in an amount (ml) by which the bottom area of the container S $cm^2$×0.1 is covered, and the container is tilted to the left and right, then erected, and further horizontally placed, it is preferable that the bottom area S' covered with the purified water is 90% or less, particularly 85% or less of the bottom area S $cm^2$.

A method for manufacturing a pharmaceutical container of the present invention is a method for manufacturing a pharmaceutical container including at least a container and a coating layer, and is characterized by including: preparing a container made of silicate glass or a resin; applying a coating agent containing a silicone-based resin to at least an inner surface of the container; and thermally curing the applied coating agent to form the coating layer.

In the method for manufacturing a pharmaceutical container of the present invention, the coating agent preferably contains an organic acid.

In the method for manufacturing a pharmaceutical container of the present invention, the organic acid is preferably one or more selected from a group consisting of amino acid, citric acid, acetic acid, and oxalic acid.

In the method for manufacturing a pharmaceutical container of the present invention, the coating layer preferably has a thickness of 10 to 2500 nm. Accordingly, defects such as pinholes are less likely to occur, and stress generated after thermal curing is reduced. Thus, deterioration, peeling, and the like of the coating layer can be prevented.

The coating agent of the present invention is a coating agent for forming a coating layer on a glass surface or a resin surface (particularly, an inner surface of the pharmaceutical container), and is characterized by containing an organopolysiloxane compound having one or more organic substituents selected from a group consisting of a methyl group, a phenyl group, an epoxy group, an ether group, and a polyester group. When the organopolysiloxane compound having the organic substituent is introduced, good water repellency can be maintained and deterioration, peeling, and the like of the coating layer can be prevented even in a state where the coating layer is in contact with a preparation having a wide pH range for a long period of time.

The coating agent of the present invention is a coating agent for forming a coating layer on an inner surface of the pharmaceutical container, and is characterized by containing an organopolysiloxane compound having one or more organic substituents selected from a group consisting of a methyl group, a phenyl group, an epoxy group, an ether group, and a polyester group. When the organopolysiloxane compound having the organic substituent is introduced, good water repellency can be maintained and deterioration, peeling, and the like of the coating layer can be prevented even in a state where the coating layer formed on the inner surface of the pharmaceutical container is in contact with a preparation having a wide pH range for a long period of time.

Preferably, the coating agent of the present invention is substantially free of a halogen component.

In the coating agent of the present invention, a content of the organopolysiloxane compound is preferably 1 to 50% by mass. Accordingly, viscosity of the coating agent is easily adjusted, and a thickness of the coating layer is easily made uniform.

In the coating agent of the present invention, the organopolysiloxane compound contains dimethylpolysiloxane, phenylpolysiloxane, and methylpolysiloxane, and when dimethylpolysiloxane:phenylpolysiloxane:methylpolysiloxane=A:B:C in a molar ratio, it is preferable that A is 0.1 to 4.0, B is 0.1 to 4.0, and C is 0.1 to 4.0.

Preferably, the coating agent of the present invention further contains one or more organic acids selected from a group consisting of citric acid, amino acid, acetic acid, and oxalic acid.

In the coating agent of the present invention, a content of the organic acid is preferably 0.1 to 10% by mass.

Advantageous Effects of Invention

According to the present invention, it is possible to provide a pharmaceutical container which has a low environmental load, is easy to handle, and has high water repellency.

DESCRIPTION OF EMBODIMENTS

Hereinafter, preferred embodiments of a pharmaceutical container and a method for manufacturing the same will be described. However, the following embodiments are merely examples, and the present invention is not limited to the following embodiments.

[Coating Agent]

A coating agent (a coating layer) for forming a coating layer contains a silicone-based resin, particularly an organopolysiloxane compound, and preferably has one or more organic substituents selected from a group consisting of a methyl group, a phenyl group, an epoxy group, an ether group, and a polyester group in a molecule thereof. When the organopolysiloxane compound having the organic substituent is introduced, good water repellency can be maintained and deterioration, peeling, and the like of the coating layer can be prevented even in a state where the coating layer is in contact with a preparation having a wide pH range for a long period of time.

The organopolysiloxane compound contains at least one siloxane structure. The siloxane structure is a structure shown below, and may be a composite structure consisting of a single chain, a chain structure, and a cage structure, and a side chain R represents a hydrogen atom or a hydrocarbon group. A polymerized siloxane composed of an oligomer and a polymer siloxane unit having an organic side chain (R≠H) is expressed as polysiloxane (SiOR1R2) n (n≥1), and R1 and R2 have one or more organic substituents selected from the group consisting of a methyl group, a phenyl group, an epoxy group, an ether group, and a polyester group.

[Chem. 1]

[Chem. 2]

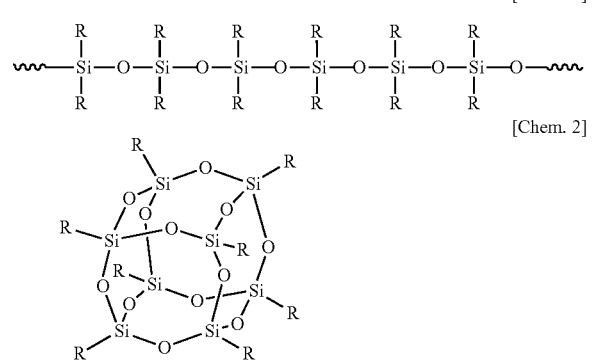

Typical examples of the polysiloxane are shown below.
Methylpolysiloxane: $(SiO(CH_4))_n$ (n≥1)
Phenylpolysiloxane: $(SiO(C_6H_6))_n$ (n≥1)
Dimethylpolysiloxane: $(SiO(CH_3)_2)_n$ (n≥1)

[Chem. 3]

[Chem. 4]

[Chem. 5]

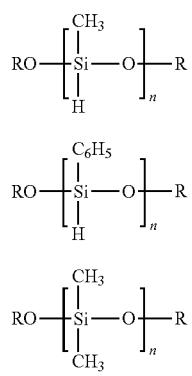

A content of the silicone-based resin, particularly the organopolysiloxane compound, in the coating agent is preferably 1% or more, 5% or more, 10% or more, particularly preferably 15% or more by mass, and is preferably 50% or less, 45% or less, particularly preferably 40% or less by mass. When the content of the silicone-based resin, particularly the organopolysiloxane compound, is too high, viscosity of the coating agent is high, and it is difficult to apply the coating agent to an inner surface of the container with a uniform thickness. As a result, during drying and thermal curing, residual stress in the coating layer tends to cause a crack and peeling.

The organopolysiloxane compound contained in the coating agent preferably contains dimethylpolysiloxane, phenylpolysiloxane, and methylpolysiloxane. When these components are contained, water repellency can be enhanced, and stability to temperature can be enhanced. When dimethylpolysiloxane:phenylpolysiloxane:methylpolysiloxane=A:B:C in a molar ratio, A is 0.1 to 4.0, B is 0.1 to 4.0, and C is 0.1 to 4.0, preferably A is 0.3 to 3.0, B is 0.4 to 2.5, and C is 0.4 to 2.5, more preferably A is 0.6 to 2.0, B is 0.7 to 1.5, and C is 0.7 to 1.5. When a molar ratio of dimethylpolysiloxane, phenylpolysiloxane, and methylpolysiloxane is out of the above range, it is difficult to sufficiently enhance the water repellency, and the stability to temperature are impaired.

The coating agent is preferably applied to an inner surface of the container in a state of being uniformly mixed with an organic solvent. The organic solvent is not particularly limited, and examples thereof include butyl alcohol, isopropyl alcohol, and isopropyl acetate. A plurality of kinds of these organic solvents may be used in combination, or only one kind of these organic solvents may be used. The content of the organic solvent in the coating agent is preferably 1% or more, 5% or more, 10% or more, 15% or more, 20% or more, particularly preferably 25% or more by mass, and is preferably 80% or less, 60% or less, particularly preferably 40% or less by mass.

The coating agent may contain a surface conditioner that adjusts a surface tension. Accordingly, it is possible to improve smoothness of the coating layer after the coating agent is applied to an inner surface of the container. A content of the surface conditioner in the coating agent is preferably 0 to 10%, more preferably 0 to 5%, particularly preferably 0.5 to 1% by mass.

The coating agent preferably further contains an organic acid such as amino acid, citric acid, acetic acid, or oxalic acid. Accordingly, excellent chemical resistance can be maintained even for a high pH solution. A plurality of kinds of organic acids may be used in combination, or only one kind of organic acid may be used. A content of the organic acid in the coating agent is preferably 0.1% or more, 0.5% or more, particularly preferably 1% or more, and is preferably 10% or less, 8% or less, 5% or less, particularly preferably 4% or less by mass. When the content of the organic acid is too high, the coating agent may erode a surface of the container when the coating agent is applied.

It is preferable that the coating agent (the coating layer) is substantially free of a halogen component, particularly a fluorine component and a chlorine component. Accordingly, an environmental load can be reduced, and handleability can be enhanced.

A peak intensity of the Raman spectrum of the coating layer is preferably 1.1 times or more the base when a fitting process is performed using a Gaussian function in each of wavenumber ranges of 900 to 1250 $cm^{-1}$, 1500 to 1650 $cm^{-1}$, and 2500 to 3000 $cm^{-1}$. Accordingly, even when a preparation having a wide pH range is filled in the container and stored for a long period of time, good water repellency can be maintained and deterioration, peeling, and the like of the coating layer can be prevented.

[Method for Applying Coating Agent]

In order to uniformly apply the coating agent, it is preferable to wash the container in advance. A washing method is not particularly limited, and removal of dust or the like by air blowing, solvent washing with purified water, acetone or the like, and the like can be performed.

A method for applying the coating agent is not particularly specified, and a dipping method, a spraying method, an electrostatic spraying method, or the like can be applied.

[Formation of Coating Layer]

After the coating agent is applied to the inner surface of the container, it is preferable to perform drying and thermal curing to form a coating layer. A drying step is a step of volatilizing the organic solvent in the coating agent. A thermal curing step is a step in which the coating agent is subjected to a dehydration condensation reaction to be firmly bonded to the inner surface of the container.

A drying temperature in the drying step is preferably 40° C. or more, 45° C. or more, particularly preferably 50° C. or more, and is preferably 180° C. or less, 170° C. or less, particularly preferably 150° C. or less. When the drying temperature is too low, the organic solvent is not sufficiently removed from the coating agent, and cloudiness, peeling, or the like easily occurs in the coating layer. When the drying temperature is too high, a thermal curing reaction occurs, and cloudiness, peeling, or the like easily occurs in the coating layer.

A drying time is preferably 5 minutes or more, 10 minutes or more, 15 minutes or more, particularly preferably 20 minutes or more, and is preferably 120 minutes or less, 100 minutes or less, particularly preferably 80 minutes or less. When the drying time is too short, the organic solvent is not sufficiently removed from the coating agent, and cloudiness, peeling, or the like easily occurs in the coating layer. When the drying time is too long, productivity of the pharmaceutical container decreases.

A thermal curing temperature in the thermal curing step is preferably 185° C. or more, 190° C. or more, particularly preferably 200° C. or more, and is preferably 450° C. or less, 400° C. or less, particularly preferably 350° C. or less. When the thermal curing temperature is too low, the thermal curing reaction does not sufficiently occur, and it is difficult to enhance the water repellency of the pharmaceutical container. On the other hand, when the thermal curing temperature is too high, thermal decomposition of the coating agent may occur and defects may occur in the coating layer, and in the worst case, the coating layer may disappear.

A thermal curing time is preferably 5 minutes or more, 10 minutes or more, particularly preferably 15 minutes or more, and is preferably 150 minutes or less, 140 minutes or less, particularly preferably 120 minutes or less. When the thermal curing time is too short, the thermal curing reaction does not sufficiently occur, and it is difficult to enhance the water repellency of the pharmaceutical container. On the other hand, when the thermal curing time is too long, the productivity of the pharmaceutical container decreases.

A thickness of the coating layer after the thermal curing is preferably 10 nm or more, 20 nm or more, 50 nm or more, 100 nm or more, 120 nm or more, 300 nm or more, 500 nm or more, and 520 nm or more, and is preferably 2500 nm or less, 2000 nm or less, particularly preferably 1500 nm or less. Accordingly, the defects such as pinholes are less likely to occur, and the stress generated after the thermal curing is reduced. Thus, the deterioration, peeling, and the like of the coating layer can be prevented.

[Container]

From a viewpoint of chemical resistance, the container is preferably made of glass, particularly silicate glass. The silicate glass preferably contains, by mass, 65 to 85% of $SiO_2$, 0 to 15% of $Al_2O_3$, 0 to 13% (preferably 1 to 13%) of $B_2O_3$, 0 to 5% of $Li_2O$, 3 to 15% of $Na_2O$, 0 to 5% of $K_2O$, 0 to 5% of BaO, 0 to 15% of CaO, and 0 to 5% of MgO. It is also preferable to contain, by mass, 65 to 85% of $SiO_2$, 1 to 15% of $Al_2O_3$, 0 to 13% (preferably 1 to 13%) of $B_2O_3$, 3 to 15% of $Na_2O$, 0 to 5% of $K_2O$, 0 to 5% of BaO, 0 to 5% of CaO, and 0 to 5% of MgO. The container may have a brown color for shielding ultraviolet rays. That is, 0.001 to 5% of $Fe_2O_3$ and 0.001 to 5% of $TiO_2$ may be contained by mass. In a case of a glass container, $SnO_2$, $Sb_2O_3$, $As_2O_3$, $CeO_2$, F, Cl, sodium sulfate, and the like can be contained as a fining agent. These contents are not particularly limited, but are preferably 0% or more, 0.001% or more, 0.002% or more, 0.005% or more, and 0.007% or more, and are preferably 2% or less, 1.8% or less, 1.5% or less, 1% or less, 0.8% or less, 0.5% or less, and 0.3% or less in terms of individual content or total content from a viewpoint of manufacturing cost and environmental load. The container is preferably made of a resin, particularly polypropylene, polyethylene, polyethylene terephthalate, polyvinyl chloride, cycloolefin polymer, cycloolefin copolymer, polymethylpentene, polycarbonate, or the like, from a viewpoint of processability into a container shape.

A coefficient of linear thermal expansion of the silicate glass at 30° C. to 380° C. is preferably $100 \times 10^{-7}$/° C. or less, $90 \times 10^{-7}$/° C. or less, $80 \times 10^{-7}$/° C. or less, $70 \times 10^{-7}$/° C. or less, $60 \times 10^{-7}$/° C. or less, $50 \times 10^{-7}$/° C. or less, or $35 \times 10^{-7}$/° C. or more and $45 \times 10^{-7}$/° C. or less. When the coefficient of linear thermal expansion at 30° C. to 380° C. is restricted to the above range, a Si elution amount decreases. The coefficient of linear thermal expansion at 30° C. to 380° C. can be measured by a dilatometer or the like.

Further, when the coefficient of linear thermal expansion of the silicate glass at 30° C. to 380° C. is high, manufacturing efficiency of the pharmaceutical container is high, but on the other hand, the Si elution amount is large, which makes it difficult to use as a pharmaceutical container. However, when the coating layer according to the present invention is formed, it can be used as a pharmaceutical container even in such a case. That is, when the coefficient of linear thermal expansion of the silicate glass at 30° C. to 380° C. is high, an effect of the present invention can be enjoyed accurately. In this case, the coefficient of linear thermal expansion of the silicate glass at 30° C. to 380° C. is preferably $25 \times 10^{-7}$/° C. or more, $30 \times 10^{-7}$/° C. or more, $40 \times 10^{-7}$/° C. or more, $50 \times 10^{-7}$/° C. or more, $60 \times 10^{-7}$/° C. or more, $70 \times 10^{-7}$/° C. or more, or $80 \times 10^{-7}$/° C. or more and $100 \times 10^{-7}$/° C. or less.

[Pharmaceutical Container]

The pharmaceutical container of the present invention can be used in various forms. For example, it is preferably used in a vial container, an ampule container, a syringe, a cartridge, and the like.

In the pharmaceutical container of the present invention, a recovery rate of purified water shown below after a heat treatment at 121° C. for 60 minutes or 180 minutes is preferably more than 95%. A recovery rate test of the purified water is performed by the following procedure using the pharmaceutical container after the heat treatment at 121° C. for 60 minutes or 180 minutes. First, after the mass of the container from which water droplets have been removed is measured by an electronic balance and recorded, the mass is measured in a state in which the pharmaceutical container is filled with the purified water, the mass of the pharmaceutical container is subtracted, and "the mass of the filled purified water" is calculated. Next, the pharmaceutical container filled with the purified water is inverted, and the pharmaceutical container emptied by discharging the purified water is placed on the electronic balance again to measure and record the mass thereof. A "mass of recovered purified water" is calculated by subtracting the mass of the pharmaceutical container from which the water has been discharged from the mass of the pharmaceutical container filled with purified water. Finally, a recovery rate of the filled purified water is calculated using a formula (1).

Recovery rate (%)={(mass of recovered purified water)/(mass of filled purified water)}×100    (1).

In the pharmaceutical container of the present invention, X/Y is preferably 10 or less, 9 or less, 7 or less, 6 or less, 5 or less, 4.5 or less, 4 or less, 3 or less, 2 or less, 1.5 or less, 1.2 or less, 1 or less, 0.7 or less, 0.5 or less, 0.3 or less, 0.1 or less, 0.07 or less, 0.05 or less, or 0.03 or less, where X μg/mL is a Si elution amount when a heat treatment is performed at 121° C. for 180 minutes in a state where the container is filled with 3% by mass of citric acid aqueous solution at pH 8 and Y nm is a thickness of the coating layer. When a value of X/Y Y is large, insoluble foreign matter is likely to be generated in a pharmaceutical product.

In the pharmaceutical container of the present invention, X'/Y is preferably 10 or less, 9 or less, 7 or less, 6 or less, 5 or less, 4.5 or less, 4 or less, 3 or less, 2 or less, 1.5 or less, 1.2 or less, 1 or less, 0.7 or less, 0.5 or less, 0.3 or less, 0.1 or less, 0.07 or less, 0.05 or less, or 0.03 or less, where X' μg/mL is a Si elution amount when a heat treatment is performed at 121° C. for 60 minutes in a state where the container is filled with the 3% by mass of citric acid aqueous solution at pH 8 and Y nm is a thickness of the coating layer. When a value of X'/Y is large, insoluble foreign matter is likely to be generated in a pharmaceutical product.

In the pharmaceutical container of the present invention, X"/Y is preferably 10 or less, 9 or less, 7 or less, 6 or less, 5 or less, 4.5 or less, 4 or less, 3 or less, 2 or less, 1.5 or less, 1.2 or less, 1 or less, 0.7 or less, 0.5 or less, 0.3 or less, 0.1 or less, 0.07 or less, 0.05 or less, or 0.03 or less, where X" μg/mL is a Si elution amount when a heat treatment is performed at 121° C. for 60 minutes in a state where the container is filled with the purified water and Y nm is a thickness of the coating layer. When a value of X"/Y is large, insoluble foreign matter is likely to be generated in a pharmaceutical product.

In the pharmaceutical container of the present invention, when the purified water is dropped onto a bottom surface of the container in an amount V (ml) equivalent to a bottom area of the container S cm$^2$×0.1, and then the container is tilted to the left and right, returned to an original state, and placed horizontally, a bottom area S' covered with the purified water is preferably 90% or less, 85% or less, 70% or less, 75% or less, 70% or less, 65% or less, 60% or less, 58% or less, 55% or less, 53% or less, particularly preferably 50% or less of the bottom area S cm$^2$. When the bottom area S' is large, the water repellency is low, an amount of an aqueous-based medicament taken out from the pharmaceutical container is small, and there is a possibility that an appropriate amount of the aqueous-based medicament cannot be administered to a patient.

A water repellency test can be carried out by the following procedure. First, the bottom area S of the container is calculated based on an inner diameter r (cm) of the container by a formula (2). Next, an amount V (mL) of the purified water calculated by a formula (3) is dropped into the container. The container to which the purified water had been dropped was laid down horizontally, then returned to the original state, and left to stand horizontally, an image of a bottom surface portion of the container was taken from below, and an area S' (cm 2) covered with the purified water with respect to the bottom area S of the container was calculated. The area S' was calculated using analysis software of a digital microscope VHX-500 (manufactured by Keyence Corporation). An area ratio (%) covered with the purified water was calculated by dividing the bottom area S' by the bottom area S.

Bottom area $S$ (cm$^2$) of container=inner diameter $r/2$ (cm) of container×inner diameter $r/2$ (cm) of container×circumferential ratio    (2)

Amount $V$ (mL) of purified water to be dropped=bottom area $S$ (cm$^2$) of container×0.1    (3)

EXAMPLES

The present invention will be described in detail based on Examples. The following Examples are merely examples, and the present invention is not limited to the following Examples.

Tables 1 to 4 show Examples (samples Nos. 1 to 4, 6, and 9 to 38) and Comparative Examples (samples Nos. 5, 7, 8, and 39) of the present invention.

TABLE 1

|  | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|
| Silicone-based resin coating | Yes | Yes | Yes | Yes | No | Yes | No | No | Yes | Yes | Yes |
| Coating method | Dip | Dip | Dip | Dip | — | Dip | — | — | Dip | Dip | Dip |
| Organic acid | Citric acid | Citric acid | No | No | — | No | — | — | Citric acid | Citric acid | Acetic acid |
| Drying temperature | 60° C. | 100° C. | 60° C. | 60° C. | No | 60° C. | No | No | 100° C. | 100° C. | 100° C. |
| Drying time | 60 min | 60 min | 60 min | 60 min | No | 60 min | No | No | 60 min | 60 min | 60 min |
| Curing temperature | 210° C. | 225° C. | 210° C. | 210° C. | No | 225° C. | No | No | 250° C. | 275° C. | 300° C. |
| Curing time | 60 min | 120 min | 60 min | 60 min | No | 120 min | No | No | 60 min | 30 min | 15 min |
| Test solution | Hydrochloric acid | Aqueous sodium hydroxide solution | Aqueous sodium hydroxide solution | Aqueous sodium hydroxide solution | Aqueous sodium hydroxide solution | Aqueous sodium hydroxide solution | Aqueous sodium hydroxide solution | Aqueous sodium hydroxide solution | Aqueous sodium hydroxide solution | Aqueous sodium hydroxide solution | Aqueous sodium hydroxide solution |
| Test solution pH | pH 4 | pH 11 | pH 11 | pH 8 | pH 8 | pH 8 | pH 8 | pH 11 | pH 11 | pH 11 | pH 11 |

TABLE 1-continued

| | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|
| Heat treatment device | Autoclave | Autoclave | Autoclave | Thermo-hygrostat | Thermo-hygrostat | Thermo-hygrostat | Thermo-hygrostat | Autoclave | Autoclave | Autoclave | Autoclave |
| Heat treatment condition | 121° C. 60 min | 121° C. 60 min | 121° C. 60 min | 40° C./ 75% RH | 40° C./ 75% RH | 40° C./ 75% RH | 40° C./ 75% RH | 121° C. 60 min | 121° C. 60 min | 121° C. 60 min | 121° C. 60 min |
| Storage period | — | — | — | 3 months | 3 months | 6 months | 6 months | — | — | — | — |
| Mass of filled purified water | 8.800 g | 8.799 g | Un-measured | Un-measured | Un-measured | Un-measured | Un-measured | 8.820 g | 8.721 g | 8.726 g | 8.708 g |
| Mass of recovered purified water | 8.792 g | 8.721 g | Un-measured | Un-measured | Un-measured | Un-measured | Un-measured | 8.219 g | 8.656 g | 8.671 g | 8.641 g |
| Recovery rate | 99.9% | 99.1% | Un-measured | Un-measured | Un-measured | Un-measured | Un-measured | 93.2% | 99.3% | 99.4% | 99.2% |
| Ratio of bottom area S' covered with water | 65% | 63% | 82% | 75% | 100% | Un-measured | 100% | 100% | Un-measured | Un-measured | 65% |
| Appearance observation | A | A | B | A | — | A | — | — | A | A | A |
| Si elution amount (μg/ml) | — | — | — | 1.2 | 1.8 | 2.1 | 2.0 | — | — | — | — |
| Thickness of film (nm) | 1300 | 1450 | 830 | 750 | — | 1680 | — | — | 1120 | 890 | 680 |
| Ratio of Raman spectral intensity to base 1000 cm$^{-1}$ | Un-measured | 19930 | 19920 | Un-measured | — | Un-measured | — | — | 19870 | Un-measured | Un-measured |
| 1030 cm$^{-1}$ | Un-measured | 5330 | 5331 | Un-measured | — | Un-measured | — | — | 5400 | Un-measured | Un-measured |
| 1035 cm$^{-1}$ | Un-measured | 2850 | 2832 | Un-measured | — | Un-measured | — | — | 2845 | Un-measured | Un-measured |
| 1060 cm$^{-1}$ | Un-measured | 2000 | 1999 | Un-measured | — | Un-measured | — | — | 2010 | Un-measured | Un-measured |
| 1092 cm$^{-1}$ | Un-measured | 845 | 833 | Un-measured | — | Un-measured | — | — | 850 | Un-measured | Un-measured |
| 1595 cm$^{-1}$ | Un-measured | 1675 | 1666 | Un-measured | — | Un-measured | — | — | 1698 | Un-measured | Un-measured |
| 2910 cm$^{-1}$ | Un-measured | 14571 | 5000 | Un-measured | — | Un-measured | — | — | 14580 | Un-measured | Un-measured |
| 2970 cm$^{-1}$ | Un-measured | 6857 | 1400 | Un-measured | — | Un-measured | — | — | 6872 | Un-measured | Un-measured |
| 3055 cm$^{-1}$ | Un-measured | 6000 | 6000 | Un-measured | — | Un-measured | — | — | 6010 | Un-measured | Un-measured |
| Glass composition (mass %) | | | | | | | | | | | |
| $SiO_2$ | 72 | 72 | 72 | 72 | 72 | 72 | 72 | 72 | 72 | 72 | 72 |
| $Al_2O_3$ | 7 | 7 | 7 | 7 | 7 | 7 | 7 | 7 | 7 | 7 | 7 |
| $B_2O_3$ | 10.9 | 10.9 | 10.9 | 10.9 | 10.9 | 10.9 | 10.9 | 10.9 | 10.9 | 10.9 | 10.9 |
| $Li_2O$ | 0 | 0 | 0 | 0 | 0 | 0 | 0 | 0 | 0 | 0 | 0 |
| $Na_2O$ | 6 | 6 | 6 | 6 | 6 | 6 | 6 | 6 | 6 | 6 | 6 |
| $K_2O$ | 2 | 2 | 2 | 2 | 2 | 2 | 2 | 2 | 2 | 2 | 2 |
| MgO | 0 | 0 | 0 | 0 | 0 | 0 | 0 | 0 | 0 | 0 | 0 |
| CaO | 1.2 | 1.2 | 1.2 | 1.2 | 1.2 | 1.2 | 1.2 | 1.2 | 1.2 | 1.2 | 1.2 |
| BaO | 0.7 | 0.7 | 0.7 | 0.7 | 0.7 | 0.7 | 0.7 | 0.7 | 0.7 | 0.7 | 0.7 |
| $Fe_2O_3$ | 0.02 | 0.02 | 0.02 | 0.02 | 0.02 | 0.02 | 0.02 | 0.02 | 0.02 | 0.02 | 0.02 |

TABLE 2

| | No. 12 | No. 13 | No. 14 | No. 15 | No. 16 | No. 17 |
|---|---|---|---|---|---|---|
| Silicone-based resin coating | Yes | Yes | Yes | Yes | Yes | Yes |
| Coating method | Dip | Dip | Dip | Dip | Dip | Dip |
| Organic acid | Citric acid | Citric acid | Citric acid | Citric acid | Citric acid | Citric acid |
| Drying temperature | No | No | No | No | No | No |

TABLE 2-continued

| | | | | | | |
|---|---|---|---|---|---|---|
| Drying time | No | No | No | No | No | No |
| Curing temperature | 275° C. | 275° C. | 275° C. | 275° C. | 275° C. | 275° C. |
| Curing time | 30 min | 30 min | 30 min | 30 min | 30 min | 30 min |
| Test solution | Water | 0.9 wt % KCl | 3 wt % Citric acid | 20 mM Glycine | 50 mM Phosphate buffer | 10 wt % Sodium thiosulfate |
| Test solution pH | pH 5 | pH 8 | pH 8 | pH 10 | pH 7 | pH 10 |
| Heat treatment device | Autoclave | Autoclave | Autoclave | Autoclave | Autoclave | Autoclave |
| Heat treatment condition | 121° C. 180 min | 121° C. 180 min | 121° C. 180 min | 121° C. 180 min | 121° C. 180 min | 121° C. 180 min |
| Storage period | — | — | — | — | — | — |
| Mass of filled purified water | 8.800 | 8.810 | 8.820 | 8.800 | 8.820 | 8.800 |
| Mass of recovered purified water | 8.790 | 8.800 | 8.500 | 8.600 | 8.760 | 8.690 |
| Recovery rate | 99.9% | 99.9% | 96.4% | 97.7% | 99.3% | 98.8% |
| Ratio of bottom area S' covered with water | 53% | 55% | 60% | 42% | 70% | 46% |
| Appearance observation | A | A | A | A | A | A |
| Si elution amount (μg/ml) | 0.7 | 0.7 | 11.4 | 1.2 | 1.2 | 1.1 |
| Thickness of film (nm) | 1500 | 1200 | 1000 | 1500 | 1300 | 1500 |
| X/Y (μg/mL/nm) | 0.0005 | 0.0006 | 0.0114 | 0.0008 | 0.0009 | 0.0007 |
| Glass composition (mass %) | | | | | | |
| $SiO_2$ | 74.0 | 76.6 | 73.0 | 72.1 | 73.8 | 72.8 |
| $Al_2O_3$ | 7 | 5 | 7 | 7 | 6 | 6 |
| $B_2O_3$ | 10.9 | 10 | 11 | 10.9 | 11 | 11 |
| $Li_2O$ | 0 | 0 | 0 | 0 | 0 | 0 |
| $Na_2O$ | 6 | 7 | 6 | 6 | 7 | 7 |
| $K_2O$ | 2 | 0 | 2 | 2 | 1 | 2 |
| MgO | 0 | 0 | 0.3 | 0 | 0 | 0 |
| CaO | 0.7 | 1.3 | 0.5 | 1.2 | 0.5 | 1 |
| BaO | 1.2 | 0 | 0 | 0.7 | 0 | 0 |
| $Fe_2O_3$ | 0.02 | 0.015 | 0.03 | 0.02 | 0.01 | 0.05 |
| $ZrO_2$ | 0.01 | 0 | 0.03 | 0.02 | 0.06 | 0.05 |
| $SnO_2$ | 0 | 0 | 0 | 0 | 0.2 | 0.1 |
| F | 0 | 0.1 | 0 | 0 | 0.2 | 0 |
| Cl | 0.1 | 0 | 0.13 | 0.1 | 0.2 | 0 |
| $Sb_2O_3$ | 0.05 | 0 | 0 | 0.05 | 0 | 0 |
| $As_2O_3$ | 0 | 0.05 | 0 | 0 | 0 | 0 |
| Coefficient of linear thermal expansion ($10^{-7}$/° C.) | 53 | 49.2 | 53.9 | 53 | 49.7 | 52.4 |

| | No. 18 | No. 19 | No. 20 | No. 21 | No. 22 |
|---|---|---|---|---|---|
| Silicone-based resin coating | Yes | Yes | Yes | Yes | Yes |
| Coating method | Dip | Dip | Spray | Spray | Spray |
| Organic acid | Citric acid | Citric acid | Citric acid | Citric acid | Citric acid |
| Drying temperature | No | No | No | No | No |

TABLE 2-continued

|  |  |  |  |  |  |
|---|---|---|---|---|---|
| Drying time | No | No | No | No | No |
| Curing temperature | 275° C. | 275° C. | 275° C. | 275° C. | 185° C. |
| Curing time | 30 min | 30 min | 30 min | 30 min | 10 min |
| Test solution | 0.001M HCl | 10 wt % Histidine | 3 wt % Citric acid | 3 wt % Citric acid | 3 wt % Citric acid |
| Test solution pH | pH 3 | pH 4 | pH 8 | pH 8 | pH 8 |
| Heat treatment device | Autoclave | Autoclave | Autoclave | Autoclave | Autoclave |
| Heat treatment condition | 121° C. 180 min | 121° C. 180 min | 121° C. 180 min | 121° C. 180 min | 121° C. 180 min |
| Storage period | — | — | — | — | — |
| Mass of filled purified water | 8.790 | 8.800 | 8.820 | 8.810 | 8.830 |
| Mass of recovered purified water | 8.650 | 8.600 | 8.650 | 8.550 | 8.450 |
| Recovery rate | 98.4% | 97.7% | 98.1% | 97.0% | 95.7% |
| Ratio of bottom area S' covered with water | 45% | 63% | 47% | 58% | 45% |
| Appearance observation | A | A | A | A | A |
| Si elution amount (μg/ml) | 0.7 | 0.8 | 12.5 | 14.8 | 5.6 |
| Thickness of film (nm) | 1000 | 2000 | 10 | 120 | 20 |
| X/Y (μg/mL/nm) | 0.0007 | 0.0004 | 1.2500 | 0.1233 | 0.2800 |
| Glass composition (mass %) |  |  |  |  |  |
| $SiO_2$ | 76.0 | 67.8 | 72.2 | 72.7 | COC |
| $Al_2O_3$ | 2.4 | 6 | 11 | 10 |  |
| $B_2O_3$ | 13 | 12 | 0 | 0.1 |  |
| $Li_2O$ | 0 | 0 | 0 | 3 |  |
| $Na_2O$ | 7 | 8 | 13 | 6 |  |
| $K_2O$ | 0 | 2 | 0 | 3 |  |
| MgO | 0 | 0 | 3.6 | 3.5 |  |
| CaO | 1.3 | 1 | 0 | 0.5 |  |
| BaO | 0 | 3 | 0 | 0 |  |
| $Fe_2O_3$ | 0.02 | 0.01 | 0.005 | 0.06 |  |
| $ZrO_2$ | 0.02 | 0 | 0.02 | 1 |  |
| $SnO_2$ | 0 | 0.2 | 0.2 | 0.1 |  |
| F | 0.2 | 0 | 0 | 0 |  |
| Cl | 0.1 | 0 | 0 | 0 |  |
| $Sb_2O_3$ | 0 | 0 | 0 | 0 |  |
| $As_2O_3$ | 0 | 0 | 0 | 0 |  |
| Coefficient of linear thermal expansion ($10^{-7}$/° C.) | 32.3 | 62 | 72 | 73.3 | Un-measured |

TABLE 3

|  | No. 23 | No. 24 | No. 25 | No. 26 | No. 27 | No. 28 | No. 29 | No. 30 | No. 31 |
|---|---|---|---|---|---|---|---|---|---|
| Silicone-based resin coating | Yes | Yes | Yes | Yes | Yes | Yes | Yes | Yes | Yes |
| Coating method | Dip | Dip | Dip | Dip | Dip | Dip | Dip | Dip | Dip |
| Organic acid | Citric acid | Citric acid | Citric acid | Citric acid | Citric acid | Citric acid | Citric acid | Citric acid | Citric acid |
| Drying temperature | No | No | No | No | No | No | No | No | No |
| Drying time | No | No | No | No | No | No | No | No | No |

TABLE 3-continued

| | No. 23 | No. 24 | No. 25 | No. 26 | No. 27 | No. 28 | No. 29 | No. 30 | No. 31 |
|---|---|---|---|---|---|---|---|---|---|
| Curing temperature | 275° C. | 275° C. | 275° C. | 275° C. | 275° C. | 275° C. | 275° C. | 275° C. | 275° C. |
| Curing time | 30 min | 30 min | 30 min | 30 min | 30 min | 30 min | 30 min | 30 min | 45 min |
| Test solution | Water | Water | Water | 3% Citric acid | 3% Citric acid | 3% Citric acid | 3% Citric acid | 3% Citric acid | 3% Citric acid |
| Test solution pH | pH 5 | pH 5 | pH 5 | pH 8 | pH 8 | pH 8 | pH 8 | pH 8 | pH 8 |
| Heat treatment device | Autoclave | Autoclave | Autoclave | Autoclave | Autoclave | Autoclave | Autoclave | Autoclave | Autoclave |
| Heat treatment condition | 121° C. 60 min | 121° C. 60 min | 121° C. 60 min | 121° C. 180 min | 121° C. 180 min | 121° C. 180 min | 121° C. 60 min | 121° C. 60 min | 121° C. 60 min |
| Storage period | — | — | — | — | — | — | — | — | — |
| Mass of filled purified water | 8.80 | 11.90 | 12.00 | 8.80 | 11.80 | 12.00 | 5.00 | 4.89 | 22.50 |
| Mass of recovered purified water | 8.79 | 11.88 | 11.90 | 8.79 | 11.76 | 11.89 | 4.89 | 4.65 | 22.30 |
| Recovery rate | 99.9% | 99.8% | 99.2% | 99.9% | 99.7% | 99.1% | 97.8% | 95.1% | 99.1% |
| Ratio of bottom area S' covered with water | 53% | 49% | 46% | 53% | 65% | 55% | 60% | 56% | 59% |
| Appearance observation | A | A | A | A | A | A | A | A | A |
| Si elution amount (μg/ml) | 0.42 | 0.99 | 2.05 | Unmeasured | Unmeasured | Unmeasured | Unmeasured | Unmeasured | Unmeasured |
| Thickness of coating layer (nm) | 100 | 110 | 100 | 150 | 95 | 105 | 2350 | 2120 | 1560 |
| X/Y (μg/mL/nm) | 0.004 | 0.009 | 0.021 | Unmeasured | Unmeasured | Unmeasured | Unmeasured | Unmeasured | Unmeasured |
| Glass composition (mass %) | | | | | | | | | |
| $SiO_2$ | 75.5 | 71.9 | 71.0 | 75.5 | 71.9 | 71.0 | 71.2 | 72.5 | 71.1 |
| $Al_2O_3$ | 5.4 | 5.2 | 3.7 | 5.4 | 5.2 | 3.7 | 5.4 | 5.3 | 5.7 |
| $B_2O_3$ | 10.7 | 7.1 | 2.1 | 10.7 | 7.1 | 2.1 | 9.5 | 9.5 | 7.6 |
| $Li_2O$ | 0.0 | 0.0 | 0.1 | 0.0 | 0.0 | 0.1 | 0.0 | 0.0 | 0.0 |
| $Na_2O$ | 6.9 | 8.3 | 13.2 | 6.9 | 8.3 | 13.2 | 5.8 | 5.6 | 6.1 |
| $K_2O$ | 0.0 | 2.1 | 1.4 | 0.0 | 2.1 | 1.4 | 2.4 | 2.3 | 1.2 |
| MgO | 0.0 | 0.2 | 1.9 | 0.0 | 0.2 | 1.9 | 0.0 | 0.0 | 0.0 |
| CaO | 1.3 | 2.6 | 5.9 | 1.3 | 2.6 | 5.9 | 0.8 | 0.0 | 0.6 |
| BaO | 0.0 | 1.8 | 0.0 | 0.0 | 1.8 | 0.0 | 1.3 | 1.2 | 2.0 |
| ZnO | 0.0 | 0.0 | 0.0 | 0.0 | 0.0 | 0.0 | 0.0 | 0.0 | 0.0 |
| $Fe_2O_3$ | 0.02 | 0.08 | 0.47 | 0.02 | 0.08 | 0.47 | 0.80 | 1.00 | 1.10 |
| $ZrO_2$ | 0.04 | 0.04 | 0.05 | 0.04 | 0.04 | 0.05 | 0.00 | 0.00 | 0.00 |
| $CeO_2$ | 0 | 0.3 | 0.001 | 0 | 0.30 | 0.00 | 0.00 | 0.00 | 0.00 |
| $P_2O_5$ | 0.002 | 0.03 | 0.006 | 0.002 | 0.03 | 0.01 | 0.00 | 0.00 | 0.10 |
| $SO_3$ | 0.01 | 0.02 | 0.05 | 0.01 | 0.02 | 0.05 | 0.00 | 0.00 | 0.00 |
| $TiO_2$ | 0.018 | 0.03 | 0.095 | 0.018 | 0.03 | 0.10 | 2.70 | 2.50 | 4.50 |
| $SnO_2$ | 0 | 0 | 0 | 0 | 0.00 | 0.00 | 0.00 | 0.00 | 0.00 |
| F | 0.15 | 0.23 | 0 | 0.15 | 0.23 | 0.00 | 0.00 | 0.00 | 0.00 |
| Cl | 0.005 | 0.025 | 0.02 | 0.005 | 0.03 | 0.02 | 0.10 | 0.08 | 0.00 |
| $Sb_2O_3$ | 0.00 | 0.00 | 0.00 | 0.00 | 0.00 | 0.00 | 0.00 | 0.00 | 0.00 |
| $As_2O_3$ | 0.050 | 0.000 | 0.000 | 0.050 | 0.000 | 0.000 | 0.000 | 0.000 | 0.000 |
| Coefficient of linear thermal expansion ($10^{-7}$/° C.) | 49 | 69 | 81 | 49 | 69 | 81 | 56 | 53 | 52 |

TABLE 4

| | No. 32 | No. 33 | No. 34 | No. 35 | No. 36 | No. 37 | No. 38 | No. 39 |
|---|---|---|---|---|---|---|---|---|
| Silicone-based resin coating | Yes | Yes | Yes | Yes | Yes | Yes | Yes | No |
| Coating method | Dip | Dip | Dip | Dip | Dip | Dip | Dip | — |
| Organic acid | Citric acid | Citric acid | Citric acid | Citric acid | Citric acid | Citric acid | Citric acid | — |
| Drying temperature | No | No | No | No | No | No | No | — |
| Drying time | No | No | No | No | No | No | No | — |
| Curing temperature | 275° C. | 300° C. | 300° C. | 275° C. | 275° C. | 275° C. | 275° C. | — |
| Curing time | 45 min | 5 min | 5 min | 30 min | 30 min | 30 min | 30 min | — |
| Test solution | 3% Citric acid | 3% Citric acid | 3% Citric acid | 3% Citric acid | 3% Citric acid | 3% Citric acid | 3% Citric acid | Water |
| Test solution pH | pH 8 | pH 8 | pH 8 | pH 8 | pH 8 | pH 8 | pH 8 | pH 5 |
| Heat treatment device | Autoclave | Autoclave | Autoclave | Autoclave | Autoclave | Autoclave | Autoclave | Autoclave |
| Heat treatment condition | 121° C. 60 min | 121° C. 60 min | 121° C. 60 min | 121° C. 60 min | 121° C. 60 min | 121° C. 60 min | 121° C. 60 min | 121° C. 60 min |
| Storage period | — | — | — | — | — | — | — | — |
| Mass of filled purified water | 22.60 | 30.20 | 31.50 | 45.80 | 45.80 | 45.70 | 45.80 | Unmeasured |

TABLE 4-continued

|  | No. 32 | No. 33 | No. 34 | No. 35 | No. 36 | No. 37 | No. 38 | No. 39 |
|---|---|---|---|---|---|---|---|---|
| Mass of recovered purified water | 22.10 | 30.00 | 30.90 | 44.30 | 44.60 | 44.30 | 44.20 | Unmeasured |
| Recovery rate | 97.8% | 99.3% | 98.1% | 96.7% | 97.4% | 96.9% | 96.5% | Unmeasured |
| Ratio of bottom area S' covered with water | 45% | 57% | 58% | 48% | 43% | 42% | 42% | 100% |
| Appearance observation | A | A | A | A | A | A | A | A |
| Si elution amount (µg/ml) | Unmeasured | Unmeasured | Unmeasured | Unmeasured | Unmeasured | Unmeasured | Unmeasured | 11.7 |
| Thickness of coating layer (nm) | 1800 | 1425 | 120 | 60 | 60 | 40 | 50 | — |
| X/Y (µg/mL/nm) | Unmeasured | Unmeasured | Unmeasured | Unmeasured | Unmeasured | Unmeasured | Unmeasured | — |
| Glass composition (mass %) | | | | | | | | |
| $SiO_2$ | 71.2 | 72.0 | 71.2 | 73.4 | 71.6 | 72.0 | 67 | 71.0 |
| $Al_2O_3$ | 5.7 | 14.0 | 6.0 | 6.1 | 5.5 | 6.9 | 3 | 3.7 |
| $B_2O_3$ | 9.9 | 0.1 | 9.7 | 10.4 | 6.8 | 10.9 |  | 2.1 |
| $Li_2O$ | 0.0 | 3.0 | 0.1 | 0.0 | 0.1 | 0.0 |  | 0.1 |
| $Na_2O$ | 5.5 | 5.7 | 7.2 | 6.8 | 8.7 | 6.1 | 13 | 13.2 |
| $K_2O$ | 1.4 | 3.7 | 1.1 | 0.6 | 2.0 | 2.3 | 3 | 1.4 |
| MgO | 0.0 | 0.0 | 0.0 | 0.0 | 0.1 | 0.2 | 4 | 1.9 |
| CaO | 0.6 | 0.0 | 1.8 | 0.8 | 2.4 | 0.4 | 6 | 5.9 |
| BaO | 1.4 | 0.0 | 0.9 | 1.2 | 2.1 | 0.0 | 3 | 0.0 |
| ZnO | 0.0 | 0.0 | 1.0 | 0.2 | 0.0 | 0.0 |  | 0.0 |
| $Fe_2O_3$ | 0.80 | 0.00 | 0.03 | 0.02 | 0.05 | 0.04 |  | 0.47 |
| $ZrO_2$ | 0.00 | 1.00 | 0.04 | 0.02 | 0.03 | 0.03 |  | 0.05 |
| $CeO_2$ | 0.00 | 0.00 | 0.40 | 0.00 | 0.23 | 1.00 | 0.6 | 0.001 |
| $P_2O_5$ | 0.00 | 0.00 | 0.00 | 0.00 | 0.00 | 0.00 | 0 | 0.006 |
| $SO_3$ | 0.00 | 0.00 | 0.02 | 0.00 | 0.00 | 0.00 | 0.2 | 0.05 |
| $TiO_2$ | 3.20 | 0.00 | 0.01 | 0.01 | 0.01 | 0.01 | 0 | 0.095 |
| $SnO_2$ | 0.00 | 0.50 | 0.04 | 0.00 | 0.00 | 0.00 | 0 | 0 |
| $F_2$ | 0.20 | 0.00 | 0.20 | 0.30 | 0.50 | 0.06 | 0.2 | 0 |
| Cl | 0.15 | 0.00 | 0.30 | 0.20 | 0.04 | 0.12 | 0 | 0.02 |
| $Sb_2O_3$ | 0.00 | 0.00 | 0.00 | 0.00 | 0.00 | 0.00 | 0.00 | 0.00 |
| $As_2O_3$ | 0.000 | 0.000 | 0.000 | 0.000 | 0.000 | 0.000 | 0.000 | 0.000 |
| Coefficient of linear thermal expansion ($10^{-7}$/° C.) | 52 | 72 | 54 | Unmeasured | 69 | Unmeasured | 96 | 81 |

[Sample No. 1]

A coating agent was prepared by mixing and dissolving 30% by mass of an organopolysiloxane compound (a silicone-based resin) containing a methyl group and a phenyl group, 15% by mass of butyl alcohol, 10% by mass of isopropyl acetate, and 45% by mass of isopropyl alcohol, and then further adding 2% by mass of citric acid thereto, followed by mixing and dissolving. A molar ratio of dimethylpolysiloxane, phenylpolysiloxane and methylpolysiloxane contained in the organopolysiloxane compound was adjusted to 1.3:1:1.

A borosilicate glass tube having an outer diameter of 20 mmφ and a thickness of 1 mm was processed to prepare a vial container having a volume of 10 mL. After the vial container was fully filled with the above coating agent and then inverted to discharge the coating agent, the vial was laid down horizontally such that a mouth of the vial faces outside, and the vial was rotated by a centrifugal separator, thereby removing the coating agent remaining in the vial container. The vial coated with the coating agent was dried for 60 minutes in a dryer heated to 60° C. Next, a thermal curing treatment was performed for 60 minutes in a dryer heated to 210° C. to 225° C. Subsequently, each of an inner side and an outer side of the vial container after the thermal curing treatment was washed three times with the purified water, and then the vial container was filled up to 90% of the volume with an aqueous hydrochloric acid solution adjusted to pH 4. Thereafter, a rubber plug and an aluminum cap were disposed in a mouth of the vial container to perform a seaming process, and then a heat treatment was performed in an autoclave at 121° C. for 60 minutes while preventing an internal liquid from leaking.

[Sample No. 2]

A vial container coated with the coating agent shown in Example 1 in the same procedure was dried for 60 minutes in a dryer heated to 100° C. Next, a thermal curing treatment was performed for 120 minutes in a dryer heated to 225° C. Subsequently, each of an inner side and an outer side of the vial container after the thermal curing treatment was washed three times with the purified water, and then the vial container was filled up to 90% of the volume with an aqueous sodium hydroxide solution adjusted to pH 11. Thereafter, a rubber plug and an aluminum cap were disposed in a mouth of the vial container to perform a seaming process, and then a heat treatment was performed in an autoclave at 121° C. for 60 minutes while preventing an internal liquid from leaking.

[Sample No. 3]

A coating agent was prepared by mixing and dissolving 30% by mass of an organopolysiloxane compound (silicone-based resin) containing a methyl group and a phenyl group, 15% by mass of butyl alcohol, 10% by mass of isopropyl acetate, and 45% by mass of isopropyl alcohol. A molar ratio of dimethylpolysiloxane, phenylpolysiloxane and methylpolysiloxane contained in the organopolysiloxane compound was adjusted to 1.3:1:1. A borosilicate glass tube (BS manufactured by Nippon Electric Glass Co., Ltd.) having an outer diameter of 20 mmφ and a thickness of 1 mm was processed to prepare a vial container having a volume of 10 mL. After the vial container was fully filled with the above coating agent and then inverted to discharge the coating agent, the coating agent remaining in the vial container is removed by a centrifugal separator. The vial coated with the coating agent was dried for 60 minutes in a dryer heated to 60° C. Next, a thermal curing treatment was performed for 60 minutes in a dryer heated to 210° C. to 225° C. After the thermal curing treatment, the vial container was taken out and cooled to room temperature. Subsequently, each of an inner side and an outer side of the vial container was washed three times with the purified water, and then the vial container was filled up to 90% of the volume with an aqueous sodium hydroxide solution adjusted to pH 11. Thereafter, a rubber plug and an aluminum cap were disposed in a mouth of the vial container to perform a seaming process, and then a heat treatment was performed in an autoclave at 121° C. for 60 minutes while preventing an internal liquid from leaking.

[Sample No. 4]

Each of an inner side and an outer side of a vial container subjected to the thermal curing treatment in the same procedure as in Example 2 was washed three times with the purified water, and then the vial container was filled up to 90% of the volume with an aqueous sodium hydroxide solution adjusted to pH 8. Thereafter, a rubber plug and an aluminum cap were disposed in a mouth of the vial container to perform a seaming process, and then the vial container was stored for 3 months in a thermo-hygrostat set at 40° C. and 75% humidity while preventing an internal liquid from leaking.

[Sample No. 5]

Each of an inner side and an outer side of a vial container with a volume of 10 mL processed from a borosilicate glass tube having an outer diameter of 20 mmφ and a thickness of 1 mm was washed three times with the purified water, and then the vial container was filled up to 90% of the volume with an aqueous sodium hydroxide solution adjusted to pH 8. Thereafter, a rubber plug and an aluminum cap were disposed in a mouth of the vial container to perform a seaming process, and then the vial container was stored for 3 months in a thermo-hygrostat at 40° C. and 75% humidity while preventing an internal liquid from leaking.

[Sample No. 6]

A vial container with a volume of 10 mL processed from a borosilicate glass tube having an outer diameter of 20 mm and a thickness of 1 mm was subjected to a thermal curing treatment in the same procedure as in Example 2. Subsequently, each of an inner side and an outer side of the vial container after the thermal curing treatment was washed three times with the purified water, and then the vial container was filled up to 90% of the volume with an aqueous sodium hydroxide solution adjusted to pH 8. Thereafter, a rubber plug and an aluminum cap were disposed in a mouth of the vial container to perform a seaming process, and then the vial container was stored for 6 months in a thermo-hygrostat set at 40° C. and 75% humidity while preventing an internal liquid from leaking.

[Sample No. 7]

Each of an inner side and an outer side of a vial container with a volume of 10 mL processed from a borosilicate glass tube having an outer diameter of 20 mmφ and a thickness of 1 mm was washed three times with the purified water, and then the vial container was filled up to 90% of the volume with an aqueous sodium hydroxide solution adjusted to pH 8. Thereafter, a rubber plug and an aluminum cap were disposed in a mouth of the vial container to perform a seaming process, and then the vial container was stored for 6 months in a thermo-hygrostat set at 40° C. and 75% humidity while preventing an internal liquid from leaking.

[Sample No. 8]

Each of an inner side and an outer side of a vial container with a volume of 10 mL processed from a borosilicate glass tube having an outer diameter of 20 mmφ and a thickness of 1 mm was washed three times with the purified water, and then the vial container was filled up to 90% of the volume with an aqueous sodium hydroxide solution adjusted to pH 11. Thereafter, a rubber plug and an aluminum cap were disposed in a mouth of the vial container to perform a seaming process, and then the vial container was subjected to a heat treatment at 121° C. for 60 minutes while preventing an internal liquid from leaking.

[Sample No. 9]

The coating agent shown in Example 1 was applied to a vial container with a volume of 10 mL processed from a borosilicate glass tube having an outer diameter of 20 mmφ and a thickness of 1 mm in the same procedure, and the vial container was dried for 60 minutes in a dryer heated to 100° C. Next, a thermal curing treatment was performed for 60 minutes in a dryer heated to 250° C. Each of an inner side and an outer side of the vial container after the thermal curing treatment was washed three times with the purified water, and then the vial container was filled up to 90% of the volume with an aqueous sodium hydroxide solution adjusted to pH 11. Thereafter, a rubber plug and an aluminum cap were disposed in a mouth of the vial container to perform a seaming process, and then the vial container was subjected to a heat treatment at 121° C. for 60 minutes while preventing an internal liquid from leaking.

[Sample No. 10]

The coating agent shown in Example 1 was applied to a vial container with a volume of 10 mL processed from a borosilicate glass tube having an outer diameter of 20 mmφ and a thickness of 1 mm in the same procedure, and the vial container was dried for 60 minutes in a dryer heated to 100° C. Next, a thermal curing treatment was performed for 30 minutes in a dryer heated to 275° C. Each of an inner side and an outer side of the vial container after the thermal curing treatment was washed three times with the purified water, and then the vial container was filled up to 90% of the volume with an aqueous sodium hydroxide solution adjusted to pH 11. Thereafter, a rubber plug and an aluminum cap were disposed in a mouth of the vial container to perform a seaming process, and then the vial container was subjected to a heat treatment at 121° C. for 60 minutes while preventing an internal liquid from leaking.

[Sample No. 11]

The coating agent shown in Example 1 was applied to a vial container with a volume of 10 mL processed from a borosilicate glass tube having an outer diameter of 20 mmφ and a thickness of 1 mm in the same procedure, and the vial container was dried for 60 minutes in a dryer heated to 100° C. Next, a thermal curing treatment was performed for 15 minutes in a dryer heated to 300° C. Each of an inner side and an outer side of the vial container after the thermal curing treatment was washed three times with the purified water, and then the vial container was filled up to 90% of the volume with an aqueous sodium hydroxide solution adjusted to pH 11. Thereafter, a rubber plug and an aluminum cap were disposed in a mouth of the vial container to perform a seaming process, and then the vial container was subjected to a heat treatment at 121° C. for 60 minutes while preventing an internal liquid from leaking.

[Sample No. 12]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with the purified water. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 13]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a KCl aqueous solution (adjusted to pH 8 with potassium hydroxide) having a concentration of 0.9% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 14]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 15]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a glycine aqueous solution (adjusted to pH 10 with sodium hydroxide) adjusted to 20 mM. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 16]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a 50 mM phosphate buffer prepared using a disodium hydrogenphosphate aqueous solution and a sodium dihydrogenphosphate aqueous solution. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 17]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with sodium thiosulfate (adjusted to pH 10 with sodium hydroxide) having a concentration of 10% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 18]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a 0.001 M aqueous hydrochloric acid solution. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 19]

The coating agent shown in Example 1 was applied to a vial with a volume of 10 mL processed from a borosilicate glass tube having an outer diameter of 22 mmφ and a thickness of 1 mm in the same procedure, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a histidine aqueous solution having a concentration of 10% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 20]

The coating agent shown in Example 1 was sprayed in a certain amount to a vial with a volume of 10 mL processed from a silicate glass tube having an outer diameter of 22 mmφ and a thickness of 1 mm through a spray nozzle to apply the coating agent uniformly and thinly, and then the applied vial container was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 21]

The coating agent shown in Example 1 was applied to a vial with a volume of 10 mL processed from a silicate glass tube having an outer diameter of 22 mmφ and a thickness of 1 mm in the same procedure as in the case of Sample No. 20, and the vial was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking.

[Sample No. 22]

The coating agent shown in Example 1 was applied to a vial made of cycloolefin copolymer with a capacity of 10 mL, an outer diameter of 22 mmφ, and a thickness of 1 mm in the same procedure as in the case of Sample No. 20, and the vial was subjected to a thermal curing treatment for 10 minutes in a dryer heated to 185° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking. After the heat treatment, the vial container was taken out, immersed in the purified water, and cooled to room temperature.

[Sample Nos. 23 to 25]

The coating agent shown in Example 1 was applied to a borosilicate glass container with a capacity of 8 to 12 mL, an outer diameter of 22 mmφ, and a thickness of 1 mm in the same procedure as in the case of Sample No. 20, and the container was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with the purified water. Thereafter, a rubber plug and an aluminum cap were disposed in a mouth of the vial container to perform a seaming process, and then the vial container was subjected to a heat treatment at 121° C. for 60 minutes while preventing an internal liquid from leaking. After the heat treatment, the vial container was taken out, immersed in the purified water, and cooled to room temperature.

[Sample Nos. 26 to 28]

The coating agent shown in Example 1 was applied to a borosilicate glass container with a capacity of 8 to 12 mL, an outer diameter of 22 mmφ, and a thickness of 1 mm in the same procedure as in the case of Sample No. 20, and the borosilicate glass was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 180 minutes while preventing an internal liquid from leaking. After the heat treatment, the vial container was taken out, immersed in the purified water, and cooled to room temperature.

[Sample Nos. 29 and 30]

The coating agent shown in Example 1 was applied to a borosilicate glass container with a capacity of 5.5 mL, an outer diameter of 16 mmφ, and a thickness of 1 mm in the same procedure as in the case of Sample No. 20, and the borosilicate glass was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 60 minutes while preventing an internal liquid from leaking. After the heat treatment, the vial container was taken out, immersed in the purified water, and cooled to room temperature.

[Sample Nos. 31 and 32]

The coating agent shown in Example 1 was applied to a borosilicate glass container with a capacity of 25 mL, an outer diameter of 30 mmφ, and a thickness of 1 mm in the same procedure as in the case of Sample No. 20, and the borosilicate glass was subjected to a thermal curing treatment for 45 minutes in a dryer heated to 275° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 60 minutes while preventing an internal liquid from leaking. After the heat treatment, the vial container was taken out, immersed in the purified water, and cooled to room temperature.

[Sample Nos. 33 and 34]

The coating agent shown in Example 1 was applied to a borosilicate glass container with a capacity of 35 mL, an outer diameter of 30 mmφ, and a thickness of 1 mm in the same procedure as in the case of Sample No. 20, and the borosilicate glass was subjected to a thermal curing treatment for 5 minutes in a dryer heated to 300° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 60 minutes while preventing an internal liquid from leaking. After the heat treatment, the vial container was taken out, immersed in the purified water, and cooled to room temperature.

[Sample Nos. 35 to 38]

The coating agent shown in Example 1 was applied to a borosilicate glass container with a capacity of 60 mL, an outer diameter of 30 mmφ, and a thickness of 1 mm in the same procedure as in the case of Sample No. 20, and the borosilicate glass was subjected to a thermal curing treatment for 30 minutes in a dryer heated to 275° C. Each of an inner side and an outer side of the vial container after the thermal curing treatment was washed three times with the purified water, and then the vial container was filled up to 90% of the volume with a citric acid aqueous solution (adjusted to pH 8 with sodium hydroxide) having a concentration of 3% by mass. Thereafter, a rubber plug and an aluminum cap were disposed in a mouth of the vial container to perform a seaming process, and then the vial container was subjected to a heat treatment at 121° C. for 60 minutes while preventing an internal liquid from leaking. After the heat treatment, the vial container was taken out, immersed in the purified water, and cooled to room temperature.

[Sample No. 39]

Each of an inner side and an outer side of a borosilicate glass container with a capacity of 12 mL, an outer diameter of 22 mmφ, and a thickness of 1 mm was washed three times with the purified water, and then the container was filled up to 90% of the volume with the purified water. Thereafter, a rubber plug and an aluminum cap were disposed in a mouth of the vial container to perform a seaming process, and then the vial container was subjected to a heat treatment at 121° C. for 60 minutes while preventing an internal liquid from leaking. After the heat treatment, the vial container was taken out, immersed in the purified water, and cooled to room temperature.

Subsequently, the vial container after the heat treatment was subjected to the following evaluations (1) to (4).

(1) Recovery Rate Test

A recovery rate test of the purified water was carried out by the following procedure. First, a vial container after a heating test was taken out, immersed in the purified water, cooled to room temperature, and washed with the purified water, then water droplets were removed, and a mass of the vial container was measured by an electronic balance and recorded. A mass was measured in a state where the vial container was filled with 8.8 mL of purified water, and the mass of the vial container was subtracted to calculate a "mass of the filled purified water". The vial container filled with the purified water is inverted, and the vial container emptied by discharging the purified water is placed on the electronic balance again to measure and record the mass thereof. A "mass of recovered purified water" is calculated by subtracting the mass of the vial container from which the water has been discharged from the mass of the vial container filled with purified water. Finally, a recovery rate of the filled purified water was calculated using a formula (1).

Recovery rate (%)={(mass of recovered purified water)/(mass of filled purified water)}×100   (1).

(2) Water Repellency Test

First, the vial container after a heating test was taken out, immersed in the purified water, cooled to room temperature, and washed with the purified water, and then water droplets were removed. Next, when the purified water is dropped onto a bottom surface of the container in an amount V (ml) equivalent to a bottom area of the container S $cm^2 \times 0.1$, and then the container is tilted to the left and right, then returned to an original state, and further placed horizontally, a ratio of a bottom area S' covered with the purified water was measured.

(3) Appearance Observation

An appearance observation was performed by holding the vial container after a heating test over a light source such as a fluorescent lamp in a state where the vial container was filled with a solvent and confirming whether there is an insoluble foreign matter in the solvent and whether there is a crack or peeling of a coating layer. A case where no insoluble foreign matter or a crack or peeling of the coating layer was observed was evaluated as "no appearance defect" and marked with "A", and a case where a slight crack or the like was observed was evaluated as "slight appearance defect" and marked with "B". A case where a crack or the like was observed was evaluated as "appearance defect" and marked with "C".

(4) Si Elution Amount Analysis

For Si elution amount analysis, a rubber plug and an aluminum cap were removed from the vial container after a heating test, and eluate in the vial container was collected into a centrifuge tube. Thereafter, a Si concentration in the eluate was analyzed by ICP-OES.

(5) Measurement of Thickness of Coating Layer

A thickness of the coating layer was measured by the following procedure. An outer surface of a container body was scratched with a wheel glass cutter (Normal Wheel Type, manufactured by Mitsubishi Diamond Industrial Co., Ltd.). A scratch was formed in a longitudinal direction so as to divide a circumference of the container into six or eight equal parts from a bottom portion to a shoulder of the container. An outer surface of the bottom portion of the container was also radially scratched so as to divide a bottom surface into six or eight equal parts. Next, one end of a soda-lime glass rod having a thermal expansion coefficient of about $100 \times 10^{-7}$/° C. was roasted and softened with an oxygen-gas burner. A mouth was held in a state where the container was inverted, and the softened glass rod was pressed against a scratched portion of a side surface of the container and held for several seconds. The glass rod was repeatedly heated and pressed until cracks develop from the shoulder to the bottom portion of the container. Cracks were similarly developed in other adjacent scratches. Finally, the heated glass rod was pressed against the bottom portion of the container to radially develop the cracks. When the cracks were generally developed, the side surface and the bottom surface of the container were tapped to remove a side surface portion and a bottom surface portion. A glass piece taken out was set on a sample holder such that the cross section faces upward, and the cross section was observed using a high spatial resolution SEM SU8220 (manufactured by Hitachi High-Tech Corporation) to measure a film thickness of the coating layer.

(6) Measurement of Coefficient of Linear Thermal Expansion

A coefficient of linear thermal expansion is measured with a dilatometer in a measurement temperature range of 30° C. to 380° C.

Examples of a measurement unit for clarifying a resin structure include an infrared spectrometer (IR) and Raman spectroscopy. In the present embodiment, the Raman spectroscopy is used from a viewpoint that resin structure information can be detected easily and with high accuracy. Raman spectra of coating layers of Sample Nos. 2, 3, and 9 were measured using a laser Raman microscope RAMAM-touch (manufactured by Nanophoton Corporation). Specifically, first, the vial container on which the coating layer was formed was cut, then the inner surface of the container was irradiated with a laser beam having a wavelength of 532 nm, and a laser irradiation area was physically narrowed using a pinhole or a slit function to obtain Raman scattering only in a minute and extremely thin portion, and thus the Raman spectra were measured in a wavenumber range of 500 to 3500 $cm^{-1}$. Each of peaks of the obtained Raman spectra was subjected to peak fitting processing using a Gaussian function, and a ratio of each peak intensity when the obtained base was defined as 1 was calculated from a formula (2).

(Intensity of each peak)/(Base intensity obtained by fitting processing)  (2)

A peak derived from stretching vibration of Si—O—Si appears near 1000 $cm^{-1}$ and 1030 $cm^{-1}$, a peak derived from deformation vibration of a C—H bond of a phenyl group appears near 1035 $cm^{-1}$, a peak derived from deformation vibration of a C—H bond of a methyl group appears near 1060 $cm^{-1}$ and 1092 $cm^{-1}$, a peak derived from stretching vibration of a C=C bond of a phenyl group appears near 1595 $cm^{-1}$, a peak derived from stretching vibration of a C—H bond of a phenyl group appears near 2910 $cm^{-1}$, a peak derived from antisymmetric stretching vibration of a C—H bond of a methyl group appears near 2970 $cm^{-1}$, and a peak derived from stretching vibration of a C—H bond of a phenyl group appears near 3055 $cm^{-1}$.

As can be seen from Tables 1 to 4, Samples Nos. 1 to 4, 6, and 9 to 38 had better water repellency than Samples Nos. 5, 7, and 8. Therefore, in a process of a lyophilized preparation, there is a possibility that the preparation can be prevented from rising, and a poor appearance of a product can be reduced. A Si elution amount of Sample No. 25 was smaller than that of Sample No. 39 which was an uncoated product.

Table 5 shows Example (Sample No. 40) and Comparative Example (Sample No. 41) of the present invention.

TABLE 5

|  | No. 40 | No. 41 |
|---|---|---|
| Silicone-based resin coating | Yes | No |
| Contact angle | 98° | 30° |
| Average transmittance 400 to 700 nm | 92 | 92 |

A coating agent was prepared by mixing and dissolving 30% by mass of an organopolysiloxane compound (a silicone-based resin) containing a methyl group and a phenyl group, 15% by mass of butyl alcohol, 10% by mass of isopropyl acetate, and 45% by mass of isopropyl alcohol, and then further adding 2% by mass of citric acid thereto, followed by mixing and dissolving. A molar ratio of dimethylpolysiloxane, phenylpolysiloxane and methylpolysiloxane contained in the organopolysiloxane compound was adjusted to 1.3:1:1.

[Sample No. 40]

A coating agent was applied onto a glass substrate (OA-10G manufactured by Nippon Electric Glass Co., Ltd.) of alkali-free aluminosilicate glass by spin coating. The glass substrate coated with the coating agent was dried for 60 minutes in a dryer heated to 60° C. Next, a thermal curing treatment was performed for 60 minutes in a dryer heated to 210° C. to 225° C. to form a coating layer having a thickness of 1500 nm on a glass surface. A contact angle and transmittance (a wavelength range of 400 to 700 nm) of the glass substrate after the thermal curing treatment were measured.

The contact angle was measured using a contact angle geometer (B100, manufactured by Asumi Giken Co., Ltd.) and purified water. The transmittance was measured using a spectrophotometer (V-670 manufactured by JASCO Corporation). A measurement wavelength is 200 to 800 nm, a sampling pitch is 1 nm, a slit width is 5 nm, and a scanning speed is 200 nm/min.

[Sample No. 41]

Using the same glass substrate as Sample No. 40 (OA-10G manufactured by Nippon Electric Glass Co., Ltd.), the contact angle and the transmittance (the wavelength range of 400 to 700 nm) were measured without forming a coating layer.

As can be seen from Table 5, the water repellency of Sample No. 40 was better than that of Sample No. 41. Sample No. 40 had the same transmittance as Sample No. 41.

The invention claimed is:

1. A pharmaceutical container comprising at least a container and a coating layer, wherein
   the coating layer is formed on at least an inner surface of the container, and
   the coating layer contains a silicone-based resin,
   wherein the silicone-based resin contains dimethylpolysiloxane, phenylpolysiloxane, and methylpolysiloxane, and dimethylpolysiloxane:phenylpolysiloxane:methylpolysiloxane=A:B:C are in a molar ratio, A is 0.1 to 4.0, B is 0.1 to 4.0, and C is 0.1 to 4.0.

2. The pharmaceutical container according to claim 1, wherein
   the coating layer is substantially free of a halogen component.

3. The pharmaceutical container according to claim 1, wherein
   the coating layer has a thickness of 10 to 2500 nm.

4. The pharmaceutical container according to claim 1, wherein
   the container is made of silicate glass, and
   the silicate glass contains, by mass, 65 to 85% of $SiO_2$, 0 to 15% of $Al_2O_3$, 0 to 13% of $B_2O_3$, 0 to 5% of $Li_2O$, 3 to 15% of $Na_2O$, 0 to 5% of $K_2O$, 0 to 5% of MgO, 0 to 15% of CaO, and 0 to 5% of BaO as a glass composition.

* * * * *